(12) United States Patent
Puryear et al.

(10) Patent No.: US 9,498,707 B2
(45) Date of Patent: Nov. 22, 2016

(54) BOUNDED COMPETITIONS IN A VIDEO GAME FRAMEWORK

(71) Applicant: Activision Publishing, Inc., Santa Monica, CA (US)

(72) Inventors: Jay Puryear, Santa Monica, CA (US); Jennifer Puno, Santa Monica, CA (US); Chris Chernoff, Santa Monica, CA (US)

(73) Assignee: Activision Publishing, Inc., Santa Monica, CA (US)

( * ) Notice: Subject to any disclaimer, the term of this patent is extended or adjusted under 35 U.S.C. 154(b) by 522 days.

(21) Appl. No.: 13/834,554

(22) Filed: Mar. 15, 2013

(65) Prior Publication Data

US 2013/0331191 A1  Dec. 12, 2013

Related U.S. Application Data

(60) Provisional application No. 61/656,980, filed on Jun. 7, 2012.

(51) Int. Cl.
*A63F 13/12* (2006.01)
*A63F 13/30* (2014.01)
*A63F 13/85* (2014.01)
*A63F 13/795* (2014.01)
*A63F 13/798* (2014.01)

(52) U.S. Cl.
CPC ............. *A63F 13/12* (2013.01); *A63F 13/795* (2014.09); *A63F 13/798* (2014.09); *A63F 13/85* (2014.09)

(58) Field of Classification Search
USPC ........................................ 463/30, 40, 42, 43
See application file for complete search history.

(56) References Cited

U.S. PATENT DOCUMENTS

| | | | |
|---|---|---|---|
| 2010/0120525 A1* | 5/2010 | Baerlocher et al. | 463/29 |
| 2011/0028207 A1* | 2/2011 | Gagner et al. | 463/25 |
| 2011/0111854 A1* | 5/2011 | Roberts et al. | 463/39 |
| 2011/0269548 A1* | 11/2011 | Barclay et al. | 463/42 |

* cited by examiner

*Primary Examiner* — Paul A D'Agostino
*Assistant Examiner* — Brandon Gray
(74) *Attorney, Agent, or Firm* — Klein, O'Neil & Singh, LLP

(57) ABSTRACT

Competitions involving video game players may include competitions subsidiary to a purpose of video game play, and may be bounded in time, either across play of multiple video games or within play of a particular video game.

11 Claims, 6 Drawing Sheets

BOUNDED COMPETITIONS IN A VIDEO GAME FRAMEWORK

CROSS REFERENCE TO RELATED APPLICATIONS

This application claims the benefit of the filing date of U.S. Provisional Patent Application No. 61/656,980, filed Jun. 7, 2012, the disclosure of which is incorporated by reference.

BACKGROUND OF THE INVENTION

The present invention relates to video games, and more particularly to video game competitions.

Video games are enjoyed by many, often allowing video game players to virtually participate in otherwise unavailable activities, whether due to requirements of skill, experience, or equipment availability, or simply due to inherent dangers of the activities.

In many games a video game player may compete against another player either in person or via an online game. Many online games offer leaderboards which allow a player to judge how a particular game play session compared against other game players. However, it is often difficult to compare the player's skill to another player's since many conventional leaderboards measure a level achieved or certain standard statistics, but may not consider the amount of time played to do so. Further, many players are driven by and desire to compete at all levels of game play, for example a player may desire to not only be the player with the highest score but also to be the best player with a particular game weapon or accessory or combination thereof.

Managing a competition with numerous players based on such non-standard statistics may be labor intensive. It may also be extremely difficult to ensure rules compliance in a multiplayer online game environment.

BRIEF SUMMARY OF THE INVENTION

Aspects of the invention provide for bounded competition in a video game framework. In one embodiment the invention provides a method for providing an open competition in a video game framework, the method comprising: receiving a registration from a player to participate in the competition; receiving game related data from a game machine utilized by the player in playing the same during a predetermined competition period; and determining a rank for each registered player based on the game related data. In some aspects the rank is determined based upon a score. In some embodiments the score is based on number of events matching a predetermined game activity event. In some aspects the game related data is game state information. In some aspects the game related data is an indication of an occurrence of a predefined event during game play. In some aspects of the invention, the method may include identification verification wherein the player may be required to submit identification information such as a username, gamer identification, a social security number, a driver license number or other personal identification information. In some aspects of the invention, the method may include age verification. In some aspects of the invention, the game machine is a video game console. In some aspects of the invention, the game machine is a smartphone. In some aspects of the invention, the game machine is a tablet computing device. In some aspects of the invention, the game machine is a personal computer. In some aspects of the invention, the competition may extend for multiple video game sessions. In some aspects of the invention, a notification is provided to the registered players to inform the players of the start of the competition. In some aspects of the invention, a player may enter multiple competitions which have at least partially overlapping durations, each of the competitions using the same game data to determine the players rank. In some aspects the multiple competitions occur over the same time periods. In some aspects the multiple competitions occur over partially overlapping time periods. In some aspects the game competitions are between the same set of game players. In some aspects the game competitions are between different sets of game players. In some aspects the sets of game players are partially overlapping.

In some aspects, the invention provides a method for providing an open competition in a video game framework, the method comprising: receiving a registration from a player to participate in the competition; receiving a submission including game state information; publishing the submission for viewing by a voting group; receiving votes from the viewing group during a predetermined time period; and determining a rank for each of a plurality of submissions based on a number of votes received.

In some aspects, the invention provides a method for providing an open competition in a video game framework, the method comprising: receiving a registration for a video game competition from a team including a plurality of members; receiving game data from a game machine for each member of the team; determining for each member a number of occurrences of a predetermined event using each member's game data within the predetermined time period; and determining a team rank based on an aggregate of the number of occurrences of the predetermined events for each member.

In some aspects, the invention provides a system for performing the above-mentioned method(s), the system having at least one processor configured by program instructions to receive a registration from a player to participate in the competition; receive data from the player via a game machine during a predetermined competition period; and determine a rank for each registered player.

In some aspects, the invention provides a method for a competition in a video game framework, comprising: entering a plurality of entities into video game competitions which occur over predefined time periods, with at least one entity entered into multiple competitions with at least partially overlapping time periods; receiving, during the time period for each competition, game play data generated through play of at least one game from each game machine utilized by the entities; determining, using the game play data, for each of the competitions, a number of events matching a predetermined game activity event for each entity entered in that competition; and determining, based on numbers of matching events, a ranking of the entities in each competition.

In some aspects, the invention provides a method for providing an open competition in a video game framework, the method comprising: receiving submissions comprising a recording of game play and game state information; publishing the submissions for viewing by a viewing group; receiving votes from the viewing group during a predetermined time period; and determining a rank for each of the submissions based on a number of votes received.

In some aspects, the invention provides a system for providing an open competition in a video game framework, comprising: a plurality of game machines configured by program instructions to receive competition parameter data and to send data during a predetermined competition period; a network; at least one processor configured by program instructions to send competition parameter data to a plurality of game machines, receive a registration sent from a game machine by an entity to participate in the competition over the network, receive data sent by the plurality of game machines during the predetermined competition period, and use the data sent by the plurality of game machines to determine a rank for each registered entity.

These and other aspects of the invention are more fully comprehended upon review of this disclosure.

DETAILED DESCRIPTION

Figure 1:
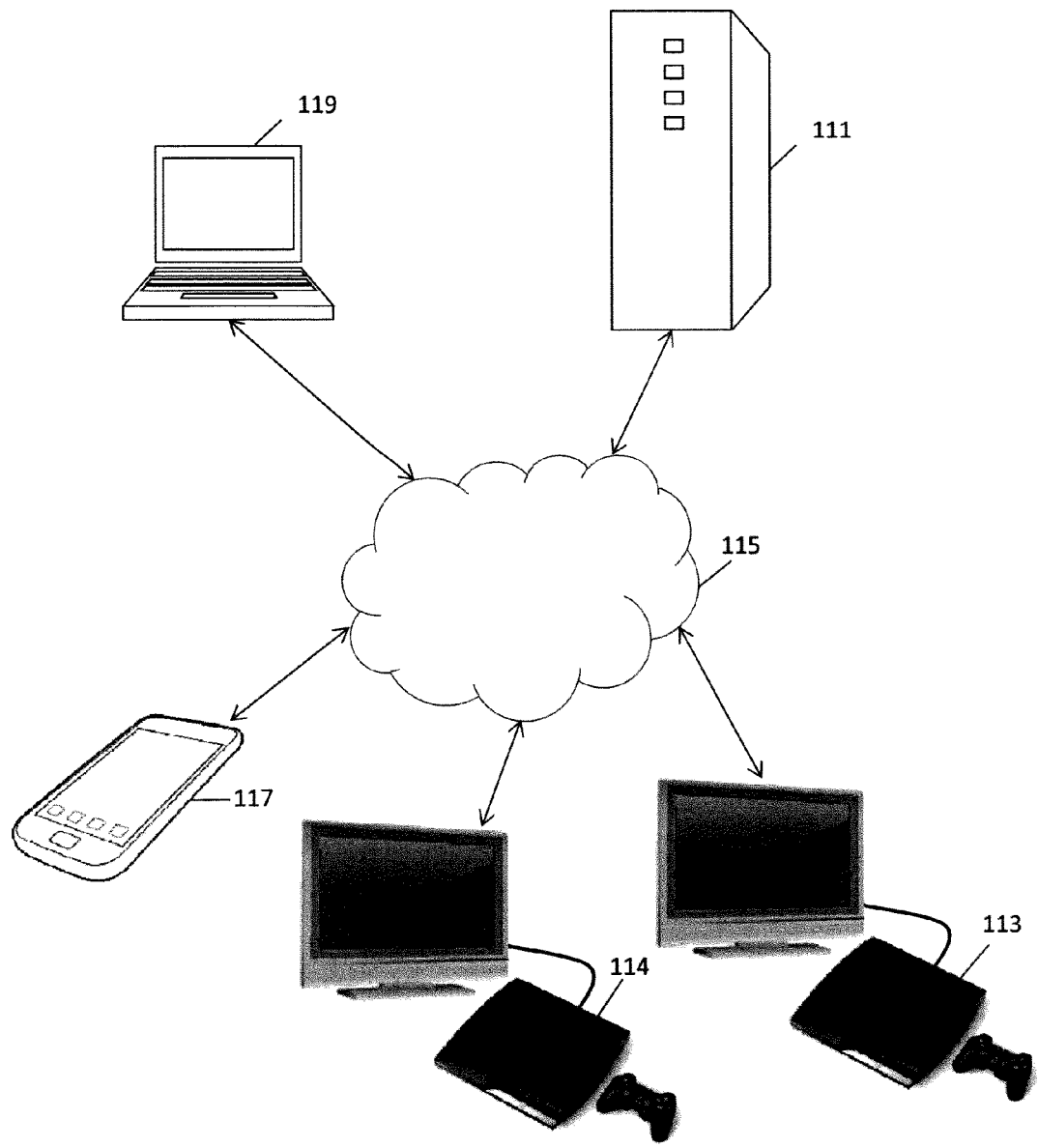
FIG. 1 is a block diagram of a system in accordance with aspects of the invention.

FIG. 1 illustrates a system in accordance with aspects of the invention. A first game console 113 and a second game console 114, each with associated monitor and game controller, are each configured for play of a video game. Although only two game consoles are explicitly shown in FIG. 1, in many embodiments the system of FIG. 1 includes many game consoles. The game console may be considered a compute device. During game play the game console, which includes at least one processor, computer memory, communication circuitry, and associated other hardware, executes program instructions to provide for play of the video game, with a video game player providing game play inputs using the game controller and the monitor associated with the game console displaying game play events. In various embodiments the video game may be an action game, for example a fighting game or a first-person shooter game, a role playing game, or a vehicle simulator game.

The game console is coupled to a network 115. The network may be a broad area network, for example the Internet. Also coupled to the network is a server 111. The server, in addition to possibly other functions, performs functions related to video game competitions amongst users of compute devices. The server may be for example be part of a server farm, including multiple servers, some of which may provide similar functions, and the server farm may be located at a co-location facility or other facility providing security, environmental conditioning, and wired Internet connections.

In addition to the game consoles and the server, compute devices (which have for example at least one processor and memory), such as a smartphone 117, and a personal computer, shown in the form a laptop computer 119 may also be coupled to the network. In some embodiments some or all of these other compute devices each may be configured for play of the video game. In some embodiments, however, only particular compute devices, for example the game console, are configured for play of the video game. The laptop may have a wired or wireless connection to the Internet. In some embodiments the laptop may be located approximate the game console, at least at some times, but in many embodiments the laptop is located at locations different than the game console. The smartphone is generally coupled to the Internet by way of a wireless cellular communications system, which may include wired communications links in addition to wireless communication channels. The server, laptop, and smartphone, of course, each have one or more processors, memory, communication circuitry, and associated hardware.

Video game competitions may be entered or selected for registration through use of the video game console, a smartphone, laptop or other personal computer, each of which may be considered game machines with one or neither in various embodiments configured to provide for game play of the video game. In some embodiments, using the smartphone as an example, the smartphone executes an application displaying options for selecting a competition to enter, and transmits the selection to the server. During the time period for a competition, a game machine providing for video game play, for example a game console or in some embodiments some other compute device, may transmit game data to the server, which may track and or compute various statistics in evaluating, for example by scoring, the competition. In some embodiments the server may validate the player identity and/or age before accepting game data from a particular player. The server may also determine a player rank for the competition based on the game data received during the time period for the competition.

Figure 2:
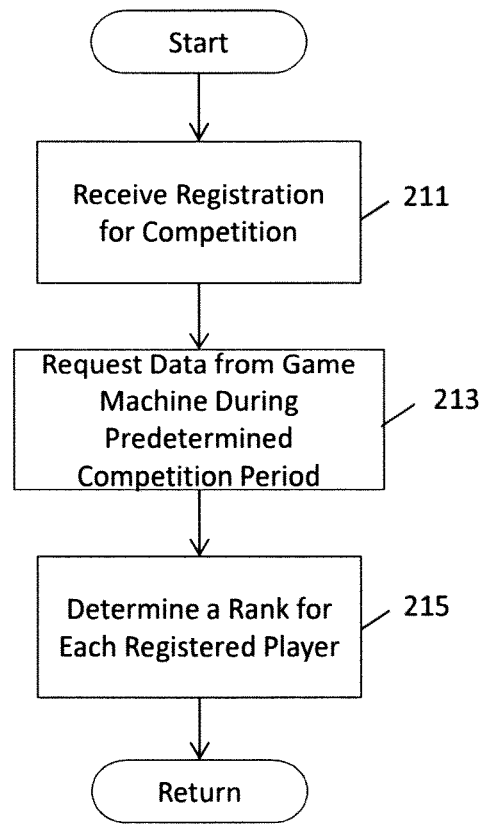
FIG. 2 is a flow diagram of a process for conducting a video game competition in accordance with aspects of the invention.

FIG. 2 is a flow diagram of a process for conducting a video game competition in accordance with aspects of the invention. In some embodiments the process is performed by a server, for example the server of FIG. 1. In some embodiments the process is performed by at least one processor configured by program instructions of the server of FIG. 1. Referring to FIG. 2, at block 211, the process receives a registration for a competition. Players may register for a competition in a variety of ways. For example, player may submit registration via an online community, email, or text message.

In some embodiments, a player may be presented with a list of available competitions. The list of available competitions may, for example, provide a description of the competition, a list of rules and requirements, a prize description, start and end dates and/or start and end times for the competition, and a counter which displays the time until competition begins and/or a time remaining for the competition. The player may register for a competition by selecting one or more of the available competitions. The player may be required to identify a game machine that will be used for conducting game play or the game machine may be identified based on a user supplied access code.

In some embodiments, the player may be required to submit identification information such as a username, gamer identification, a social security number, a driver license number or other personal identification information. The process may also provide for age verification, for example when the game is rated such that it is not suitable for children or where a monetary prize may be awarded.

Each of the available competitions may have a different duration or objective. For example, in one competition the objective may be to achieve the best success/loss ratio within an allotted time period. In another competition, the objective may be to score the most points using a particular video game weapon or accessory or configuration thereof, for example, most successes using an AK-47 assault weapon. The competition may also be limited to a particular level of the game or particular area of the video game world.

In some embodiments, registration may be permitted until the time period for competition has concluded. In this case, the player may join a competition which is in progress and compete for the remaining duration of the competition time period. Alternatively, the registration may close upon the start of the competition such that a player that has not registered may not participate.

At block 213, the process requests data from a game machine during a predetermined competition period. In some embodiments, the game machine may be a video game console. Alternatively, the game machine may be a mobile device such as a smartphone, a tablet device, a laptop computer or other computing device configured with video game software.

The game device provides game play data for a video game to the server via the network during the time period designated for the competition. In some embodiments, the player may have started playing the game prior to time period for the competition. In such a case, the game play data and any achievement (e.g., points, kills, etc.) earned prior to the start of the competition may be discarded.

In some embodiments, the request for data may include a request to provide data indicative of an occurrence of a predetermined event, such as a kill shot, for example. In this case, the game play data may include only the requested data. Alternatively, the game play data may include the requested event data in addition to other game data.

In some embodiments, the process may further provide notification to the registered players to inform the players of the start of the competition. The notification may be provided at designated period before the start of the competition, such as 1 week, 1 day, 1 hour and/or 1 minute before the start of the competition. In addition, a similar notification may also be provided to warn the registered player of the conclusion of competition time period. The notification may be provided for example, via email, text message, push notification and the like. In some embodiments the notification may also be provided to the game device.

Each competition has a duration which may be set for any desired length, such as for example, 1 hour, 1 day, 1 week, 1 month or any other time period. In some embodiments, a particular date and time may be specified for the end of a competition. In some embodiments, both a set duration of game play and a date and time may be specified. For example, the competition may allow a player to play a maximum of 24 hours prior to a particular date (e.g., July 1).

At block 215, the process determines a rank for each registered player. The player rank may be determined, for example based on a number of occurrences of a predetermined event within data received from the player's game machine over the duration of the video game competition. Of course, other game related metrics may also be used to determine a player's rank. In some embodiments, the player rank may be determined based on a score. In some embodiments, the score may be based on a number of events matching a predetermined game activity event.

The player rank information may also be displayed via a display of the game machine. In some embodiments, the player rank may be determined prior to the conclusion of the competition so that players may judge their progress throughout the competition. In some embodiments, a prize may be presented to players according to their rank. The prize may be a monetary prize, a game-related prize such a downloadable content, in-game or user community badging, game experience points and/or other prizes.

Thereafter, the process returns.

Figure 3:
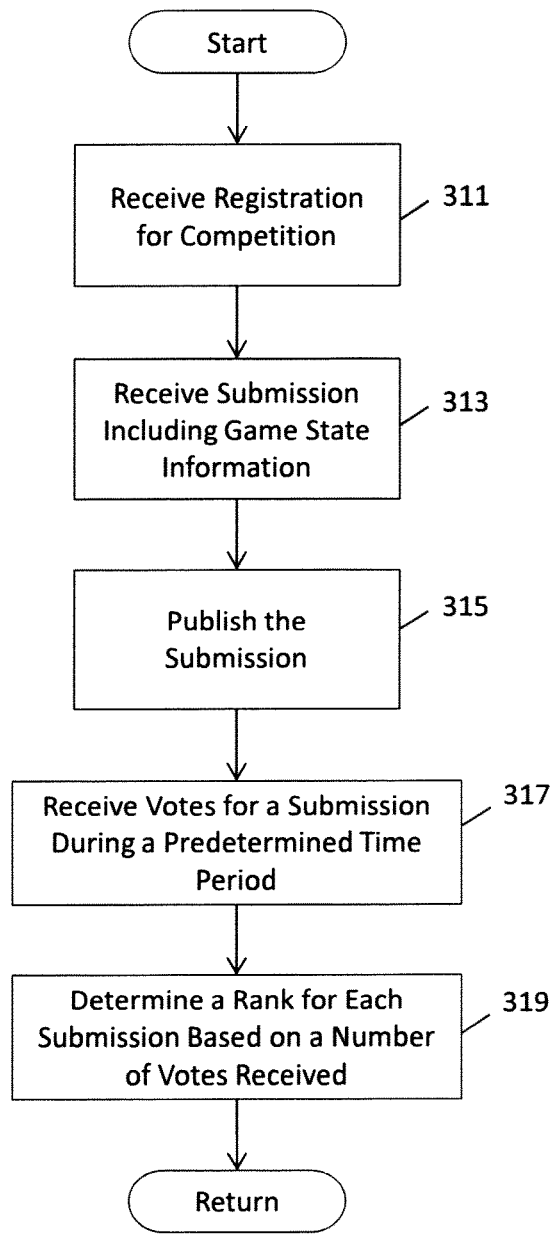
FIG. 3 is a flow diagram of a process for conducting a competition using submission including video game state information in accordance with aspects of the invention.

FIG. 3 is a flow diagram of a process for conducting a competition using submissions including video game state information in accordance with aspects of the invention. In some embodiments the process is performed by a server, for example the server of FIG. 1. In some embodiments the process is performed by at least one processor configured by program instructions of the server of FIG. 1. At block 311, the process receives a request for registration for competition. In some embodiments the request for competition includes information indentifying a game player. In some embodiments the request is received over a network from a mobile compute device not configured for game play. In some embodiments received from a game console configured for game play.

At block 313, the process receives a submission including game state information. The submission may include for example a screen shot from a video game, or a video of a game play sequence for a particular video game. In some embodiments, the video game system may be configured with editing software, such that the player may edit a screen shot, a video game image, or frames from a game play sequence to create an entertaining submission. For example, the player may incorporate dialog bubbles into an image to produce a cartoon or may add an audio track or a voice over track to a video of a game play sequence.

At block 315, the process publishes the submission such that it viewable to a voting group. The submission may be published via a social media outlet or a website hosted by the server. In some embodiments, process may include restrictions which limit viewing access for the submissions. For example, the submission may be published such that it is viewable to the registered players only, to a particular video game player community, or the public at large.

At block 317, the process receives votes from the viewing group during a predetermined time period. A viewer of the submissions may vote for a particular submission by submitted via email, text message, telephone, social media mechanism (e.g., selecting 'like') or other voting means. In some embodiments, the voting may be subject to restrictions. For example, a particular viewer may be restricted such to one vote for a given period. Other voting restriction could also be used to further protect the integrity of the competition.

At block 319, the process determines a rank for each of the submissions based on a number of votes received. In some embodiments, a prize may also be award based on the rank for a player's submission.

The process thereafter returns.

Figure 4:
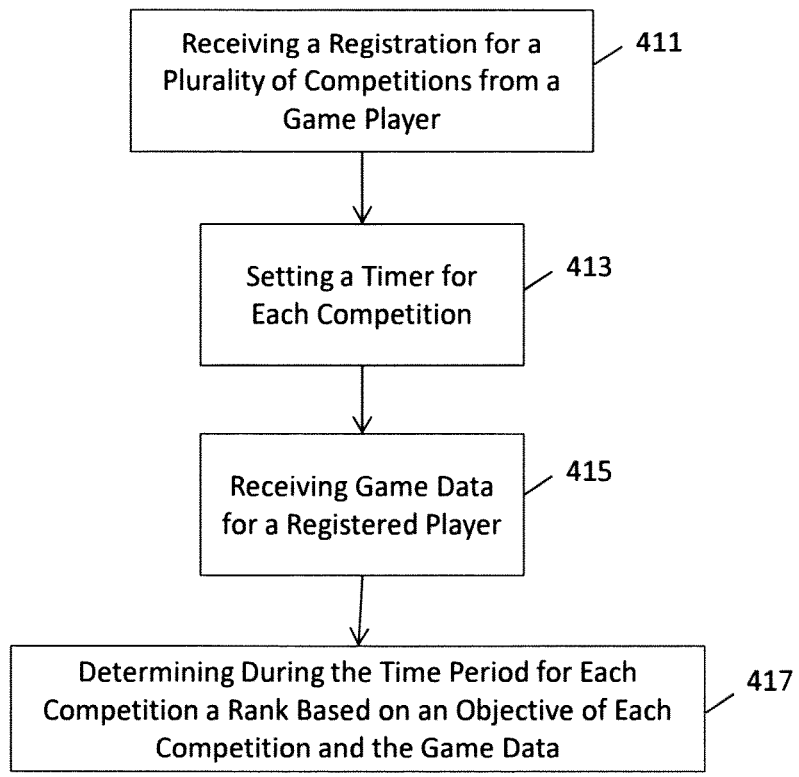
FIG. 4 is a flow diagram of a process for competing in multiple video game competitions using the same game data in accordance with aspects of the invention.

FIG. 4 is a flow diagram of a process for competing in multiple video game competitions using the same game data in accordance with aspects of the invention. In some embodiments the process is performed by a server, for example the server of FIG. 1. In some embodiments the process is performed by at least one processor configured by program instructions of the server of FIG. 1. Referring to FIG. 4, the process receives a registration for plurality of competitions from a game player at block 411.

At block 413, the process sets a timer for each competition. Each of the competitions may have a different duration. For example, a first competition may have a duration of the 24 hours, while a second competition may have a duration of the 1 week.

In some embodiments, the multiple competitions may occur over the same time period, over partially overlapping time periods, or over wholly separate time periods.

In some embodiments, the multiple competitions may include the same set of registered players, a different set of registered players, or the multiple competitions may include a set of registered players which are partially overlapping. In some embodiments the multiple competitions may relate to the same video game, different video games or some competitions may relate to the same video game while other competitions relate to a different video game.

At block 415, the process receives game data for a registered player. To protect the integrity of the competition, the user may be required to input personal identification information (e.g., Playstation® Network ID or Xbox Live ID) before game data from the user's game machine will be accepted and considered for the competition.

At block 417, the process determines during the time period for each competition a rank based on an objective of each competition and the game data. The game data may be evaluated for each of the entered competitions. In some embodiments, where the multiple competitions relate to the same game, the same game data or a portion thereof may be evaluated for each of the entered competitions. For example, the game player may play one scenario with the game player's accomplishments in the one scenario applicable in multiple competitions. In some embodiments, a game player may play multiple scenarios at the same time, jumping back and forth between scenarios, and the game player's accomplishments in each scenario is only applicable to the competition for that scenario.

Figure 5:
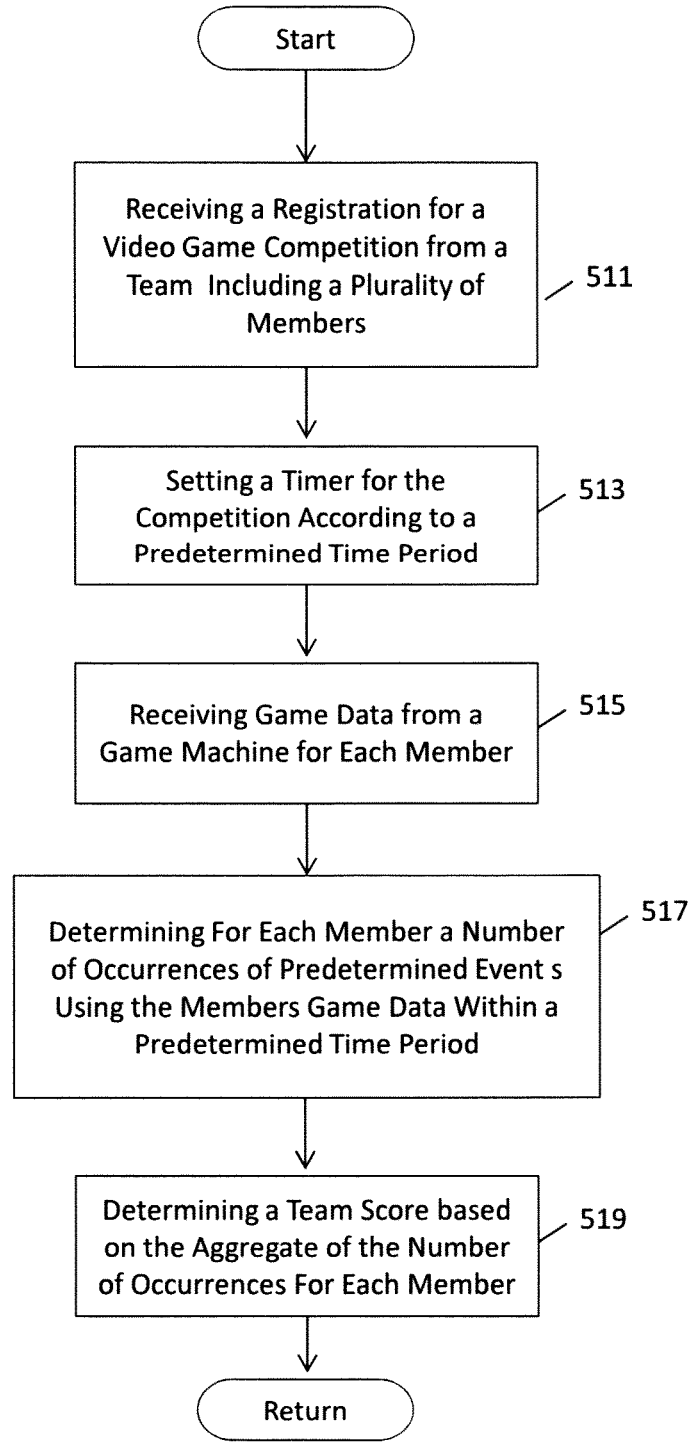
FIG. 5 is a flow diagram of a process for conducting a team video game competition in accordance with aspects of the invention.

FIG. 5 is a flow diagram of a process for conducting a team video game competition in accordance with aspects of the invention. In some embodiments the process is performed by a server, for example the server of FIG. 1. In some embodiments the process is performed by at least one processor configured by program instructions of the server of FIG. 1. At block 511, the process receives a registration for a video game competition from a team including a plurality of members. In some embodiments, a designated member of a team may submit a registration on behalf of a team. Alternatively, each member may be required to submit a registration designating membership on a particular team.

A particular member may be a member of multiple teams or may be limited to a single team membership.

At block 513, the process sets a timer for the competition according to a predetermined time period for the competition.

At block 515, the process receives game data from a game machine for each member of the team. In some embodiments, the members of a team may play cooperatively in a massively multiplayer online game (MMOG). Further, a team may play against other teams registered in the competition in a round robin fashion.

At block 517, the process determines for each member a number of occurrences of a predetermined event using each member's game data within the predetermined time period.

At block 519, the process determines a team rank based on an aggregate of the number of occurrences of the predetermined events for each member.

In some embodiments, a rank of the individual members of each team may also be determined and transmitted to game machines for display.

Thereafter, the process returns.

Figure 6:
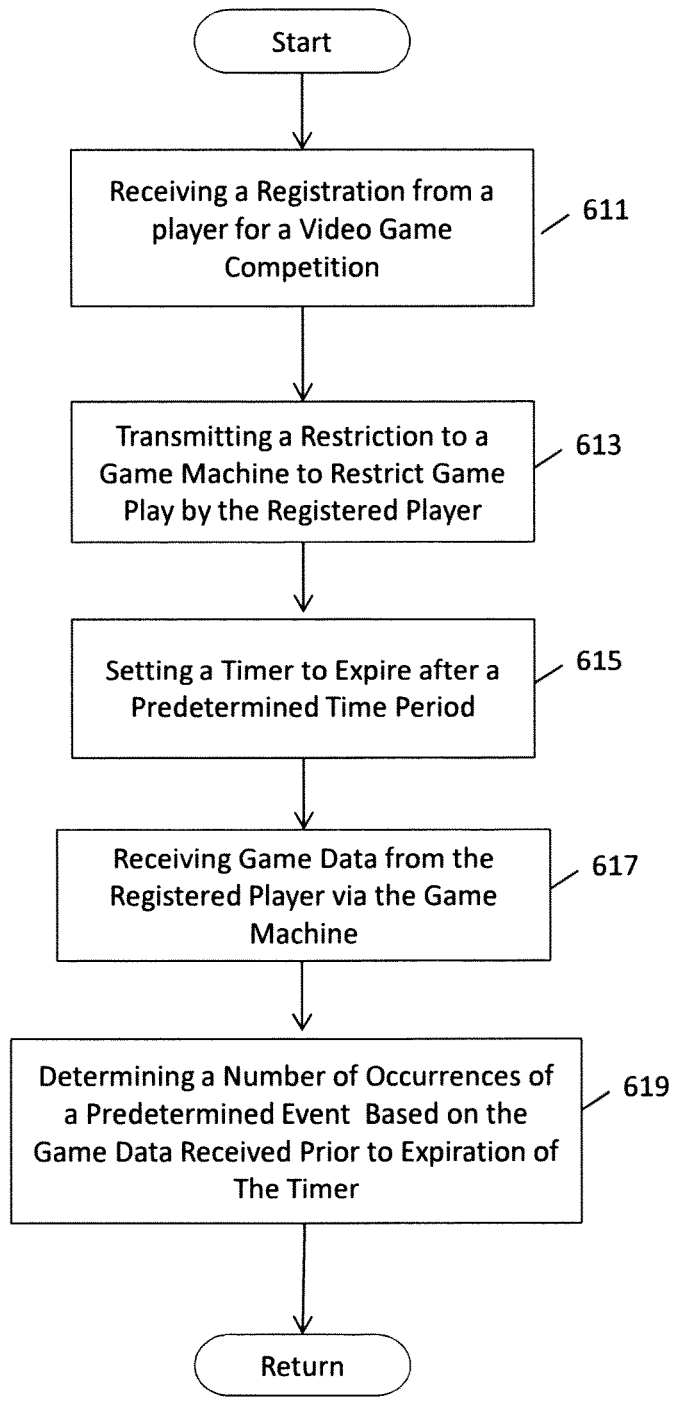
FIG. 6 is a flow diagram of a process for conducting a video game competition in accordance with aspects of the invention.

FIG. 6 is a flow diagram of a process for conducting a video game competition in accordance with aspects of the invention. In some embodiments the process is performed by a server, for example the server of FIG. 1. In some embodiments the process is performed by at least one processor configured by program instructions of the server of FIG. 1. At block 611, the process receives a registration from a player for a video game competition.

At block, 613, the process transmits a restriction to a game machine to restrict game play by the registered player. In some embodiments, the player may be restricted to using a particular character or a particular weapon during game play or configuration thereof. For example, in one competition, the players may be required to use a particular loadout such as, an AK-47 with Red Dot sight attachment as a primary weapon, a Markov handgun with extended magazine as a secondary weapon, a fragmentation grenade as a lethal weapon, and a claymore anti-personnel mine as an equipment option.

If a player opts to play the video game using a different configuration than designated for the competition, the game data during that period is discarded. In some embodiments, the player may be disqualified from further competition.

At block 615, the process sets a timer to expire after a predetermined time period. For example, the timer may be set to expire after 1 hour, 24 hours, 1 week or some other time period.

At block 617, the process receives game data from a registered player via the game machine. In some embodiments, the game data may be an indication of an occurrence of a predetermined event matching a purpose of the competition. In some embodiments, the game data may include the indication of the occurrence of the predetermined event, and in some embodiments may also or instead include other game data.

At block 619, the process determines a number of occurrences of a predetermined event based on the game data received prior to the expiration of the timer. In some embodiments, the process may further determine a player rank. The player rank may be determined based on a score. In some embodiments, the score may be determined based on the number of the occurrences of the predetermined event.

Thereafter, the process returns.

Accordingly, although aspects of the invention have been described with respect to various specific embodiments, it should be recognized that the invention comprises the novel and non-obvious claims supported by this disclosure.

What is claimed is:

1. A method performed using a server having at least one processor for providing an open competition in a video game framework, the method comprising:
   receiving, by the server, submissions comprising a recording of game play and game state information;
   publishing, by the server, the submissions for viewing by a viewing group;
   subsequent to publication of the submissions, receiving, by the server, votes on the submissions from the viewing group during a predetermined time period; and
   determining, by the server, a rank for each of the submissions based on a number of votes received:
   wherein the recording of game play comprises an audio visual recording of game play.

2. The method of claim 1, wherein the submissions are published via a social media outlet.

3. The method of claim 1, wherein the submissions are published via a website hosted by the server.

4. The method of claim 1, wherein the viewing group comprises registered players.

5. The method of claim 1, wherein a viewer from the viewing group is restricted to one vote for a given period.

6. The method of claim 1, wherein a prize is awarded based on the rank for each of the submissions.

7. The method of claim 1 further comprising receiving registrations for the open competition by game players.

8. The method of claim 1 further comprising setting a timer for the open competition based on a predetermined time period for the competition.

9. The method of claim 8, wherein the predetermined time period for the competition is 24 hours.

10. The method of claim 8, wherein the predetermined time period for the competition is one week.

11. The method of claim 1 further comprising transmitting the rank for each of the submissions to game machines for display.

* * * * *

UNITED STATES PATENT AND TRADEMARK OFFICE
CERTIFICATE OF CORRECTION

PATENT NO. : 9,498,707 B2
APPLICATION NO. : 13/834554
DATED : November 22, 2016
INVENTOR(S) : Jay Puryear, Jennifer Puno and Chris Chernoff Page 1 of 1

It is certified that error appears in the above-identified patent and that said Letters Patent is hereby corrected as shown below:

In the Claims

In Column 8, Line 59, in Claim 1, delete "received:" and insert --received;--, therefor.

Signed and Sealed this
Thirteenth Day of February, 2018

Andrei Iancu
*Director of the United States Patent and Trademark Office*